US010277488B2

(12) United States Patent
Leff et al.

(10) Patent No.: US 10,277,488 B2
(45) Date of Patent: Apr. 30, 2019

(54) SYSTEM AND METHOD FOR MANAGEMENT AND RECOVERY OF MULTI-SERVICE WEB TRANSACTIONS

(71) Applicant: International Business Machines Corporation, Armonk, NY (US)

(72) Inventors: Avraham Leff, Yorktown Heights, NY (US); James T Rayfield, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 15/260,941

(22) Filed: Sep. 9, 2016

(65) Prior Publication Data

US 2018/0077038 A1    Mar. 15, 2018

(51) Int. Cl.
| | | |
|---|---|---|
| *H04L 12/00* | (2006.01) |
| *G06F 17/30* | (2006.01) |
| *H04L 12/26* | (2006.01) |
| *H04L 29/08* | (2006.01) |
| *H04L 12/24* | (2006.01) |

(52) U.S. Cl.
CPC ........ *H04L 43/0823* (2013.01); *H04L 67/142* (2013.01); *H04L 41/0654* (2013.01); *H04L 67/02* (2013.01)

(58) Field of Classification Search
CPC ........................... H04L 43/0823; H04L 12/26
USPC .......................................... 709/226; 707/684
See application file for complete search history.

(56) References Cited

U.S. PATENT DOCUMENTS

| | | | | |
|---|---|---|---|---|
| 7,206,805 | B1 * | 4/2007 | McLaughlin, Jr. ..... | G06F 9/466 707/999.01 |
| 7,290,056 | B1 * | 10/2007 | McLaughlin, Jr. ......................... | H04L 43/0852 709/201 |
| 7,343,554 | B2 * | 3/2008 | Waldorf .............. | G06F 17/2247 715/236 |
| 7,698,398 | B1 * | 4/2010 | Lai ............................ | G06F 8/10 709/223 |
| 7,831,693 | B2 * | 11/2010 | Lai ......................... | G06Q 10/10 706/27 |

(Continued)

FOREIGN PATENT DOCUMENTS

| | | |
|---|---|---|
| WO | 03102840 A1 | 12/2003 |
| WO | 2009135042 A2 | 11/2009 |
| WO | 2015039269 A1 | 3/2015 |

OTHER PUBLICATIONS

Thomas Gschwind, Kave Eshghi, Pankaj K. Garg, Klaus Wurster "WebMon: A Performance Profiler for Web Transactions" Hewlett Packard Labs 1501 Page Mill Road, Palo Alto, CA 94304.

(Continued)

*Primary Examiner* — Frantz Coby
(74) *Attorney, Agent, or Firm* — Harrington & Smith (57) ABSTRACT

A method is provided, the method including initiating execution of a macro-transaction comprising a set of micro-transactions, wherein execution of a given micro-transaction is based at least on a set of prerequisites associated with the given micro-transaction; causing a pending state of a first micro-transaction to be stored on a database; executing the first micro-transaction; and updating the state of the first micro-transaction in the database based at least on a result returned in response to executing of the first micro-transaction. An apparatus and computer program product are also provided.

20 Claims, 8 Drawing Sheets

(56) References Cited

U.S. PATENT DOCUMENTS

| | | | | |
|---|---|---|---|---|
| 8,069,435 B1* | 11/2011 | Lai | ............... | G06Q 10/10 |
| | | | | 717/106 |
| 8,346,929 B1* | 1/2013 | Lai | ............... | G06Q 10/10 |
| | | | | 709/226 |
| 2002/0032573 A1* | 3/2002 | Williams | ............... | G06Q 10/08 |
| | | | | 705/335 |
| 2002/0194244 A1* | 12/2002 | Raventos | ............... | G06F 9/466 |
| | | | | 718/101 |
| 2003/0069922 A1* | 4/2003 | Arunachalam | ........ | G06Q 20/04 |
| | | | | 709/203 |
| 2008/0162317 A1 | 7/2008 | Banaugh et al. | | |
| 2011/0179141 A1* | 7/2011 | Ravichandran | ........ | G06Q 10/06 |
| | | | | 709/218 |
| 2013/0117238 A1* | 5/2013 | Gower | ............... | G06F 11/1412 |
| | | | | 707/684 |
| 2014/0068094 A1* | 3/2014 | Burch | ............... | H04L 67/14 |
| | | | | 709/229 |
| 2014/0180826 A1 | 6/2014 | Boal | | |
| 2015/0193879 A1 | 7/2015 | Pessin | | |
| 2015/0227910 A1* | 8/2015 | Maxwell | ............... | G06Q 20/29 |
| | | | | 705/44 |
| 2016/0005270 A1* | 1/2016 | Marr | ............... | A63F 13/30 |
| | | | | 463/25 |
| 2016/0012465 A1 | 1/2016 | Sharp | | |
| 2017/0113143 A1* | 4/2017 | Marr | ............... | A63F 13/792 |
| | | | | 3/792 |
| 2017/0140474 A1* | 5/2017 | Tran | ............... | G06Q 50/01 |
| 2017/0193487 A1* | 7/2017 | Summers | ............... | G06Q 20/29 |

OTHER PUBLICATIONS

Hector Garcia-Molina, Kenneth Salem "Sagas" https://www.cs.cornell.edu/andru/cs711/2002fa/reading/sagas.pdf.
Wikipedia "Compensating Transaction" https://en.wikipedia.org/w/index.php?title=Compensating_transaction&oldid=612204693.
IBM Developer Works "Approaching Web Services Transactions" http://www.ibm.com/developerworks/library/ws-tranart/.

* cited by examiner

SYSTEM AND METHOD FOR MANAGEMENT AND RECOVERY OF MULTI-SERVICE WEB TRANSACTIONS

BACKGROUND

This invention relates generally to web services and, more specifically, relates to management and recovery of multi-service web transactions.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

It is becoming increasingly more common that web-service implementation involves multiple serial and parallel calls to other web-services. This is especially true with micro-service architectures and calls to persistence services such as, IBM's CLOUDANT for example. These web-services calls can be successful, can fail due to client error (e.g. HTTP 400 error) or server error (e.g. HTTP 500 error), or can go into an unknown state due to timeout, in which case the call could have succeeded or failed.

Typically, web-services are written in a manner that assumes that if something goes awry in a sequence of web-service invocations, then there is no need to undo partial work that was created by successful execution of some of the web-service invocations. This assumption can be incorrect, leaving the web-services in an incorrect state that can affect subsequent interactions.

SUMMARY

This section is intended to include examples and is not intended to be limiting.

According to an embodiment, a method is provided, the method comprising initiating execution of a macro-transaction comprising a set of micro-transactions, wherein execution of a given micro-transaction is based at least on a set of prerequisites associated with the given micro-transaction; causing a pending state of a first micro-transaction to be stored on a database; executing the first micro-transaction; and updating the state of the first micro-transaction in the database based at least on a result returned in response to executing of the first micro-transaction.

According to another embodiment, an apparatus is provided including at least one processor; and at least one non-transitory memory including computer program code, the at least one memory and the computer program code configured to, with the at least one processor, cause the apparatus at least to: initiate execution of a macro-transaction comprising a set of micro-transactions, wherein execution of a given micro-transaction is based at least on a set of prerequisites associated with the given micro-transaction; cause a pending state of a first micro-transaction to be stored on a database; execute the first micro-transaction; and cause the state of the first micro-transaction to be updated in the database based at least on a result returned in response to execution of the first micro-transaction.

According to another embodiment, a computer program product for managing a macro-transaction, the computer program product comprising a non-transitory computer readable storage medium having program instructions embodied therewith, the program instructions executable by a device to cause the device to: initiate execution of the macro-transaction having a set of micro-transactions, wherein execution of a given micro-transaction is based at least on a set of prerequisites associated with the given micro-transaction; cause a pending state of a first micro-transaction to be stored on a database; execute the first micro-transaction; and update the state of the first micro-transaction in the database based at least on a result returned in response to executing of the first micro-transaction.

BRIEF DESCRIPTION OF THE DRAWINGS

These and other features, aspects, and advantages of the present invention will be better understood with regard to the following description, appended claims, and accompanying drawings where:

DETAILED DESCRIPTION

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular embodiment of the invention, or a particular claim, that feature can also be used, to the extent possible, in combination with and/or in the context of other particular aspects and embodiments of the invention, and in the invention generally.

When reference is made herein to a method comprising two or more defined steps, the defined steps can be carried out in any order or simultaneously (except where the context excludes that possibility), and the method can include one or more other steps which are carried out before any of the defined steps, or after all of the defined steps (except where the context excludes that possibility).

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for management and recovery of multi-service web transactions. Additional description of these techniques is presented after a system into which the exemplary embodiments may be used is described.

Figure 1:
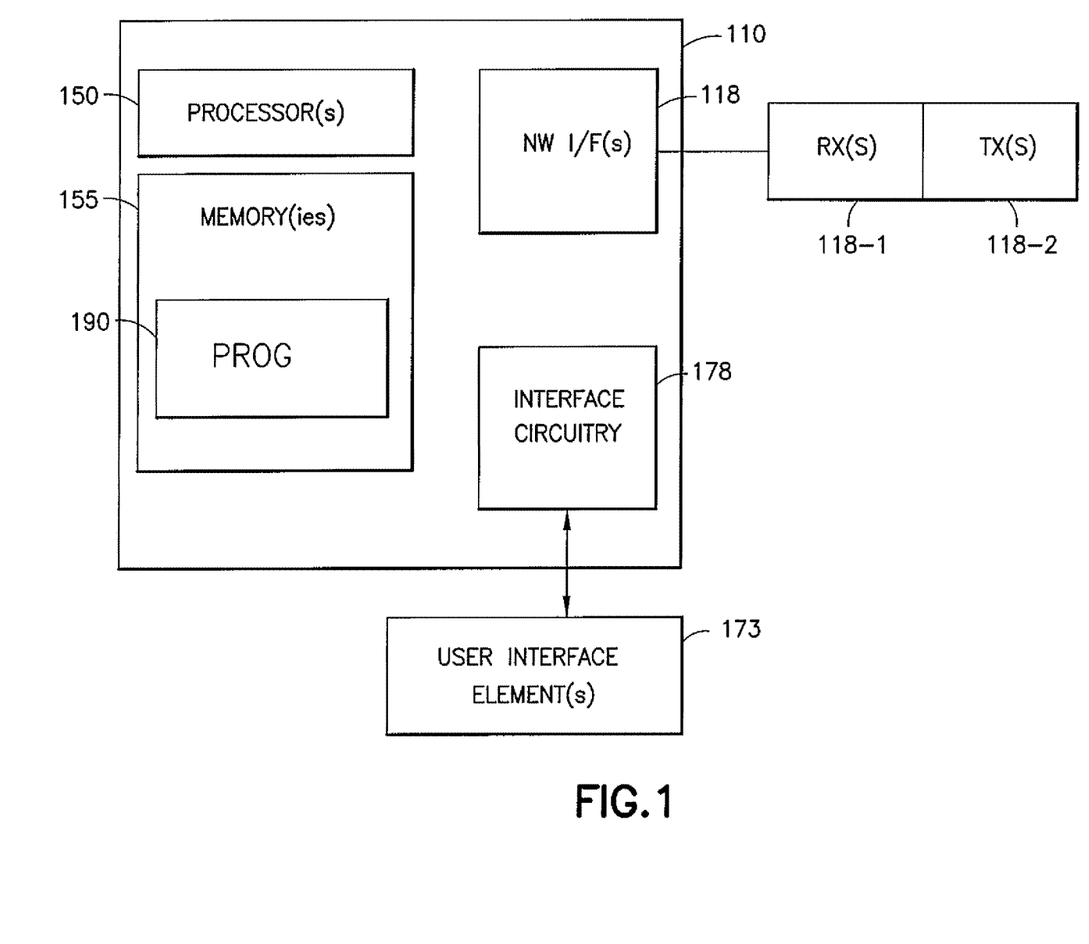
FIG. 1 is a simplified block diagram of an example apparatus in accordance with exemplary embodiments.

Referring now to FIG. 1, this figures illustrates a simplified block diagram of various electronic devices and apparatuses that are suitable for use in practicing the exemplary embodiments described herein. The computer 110 includes a controller, such as a computer or a data processor(s) 150 and a computer-readable memory or medium embodied as a memory(ies) 155 that stores a program of computer instructions (PROG) 190.

The PROG 190 includes program instructions that, when executed by the associated processor(s) 150, enable the various electronic devices and apparatuses to operate in accordance with exemplary embodiments. That is, various exemplary embodiments may be implemented at least in part by computer software executable by the processors 150 of the computer 110, or by hardware, or by a combination of software and hardware (and firmware).

The memory(ies) 155 may be of any type suitable to the local technical environment and may be implemented using any suitable data storage technology, such as semiconductor based memory devices, flash memory, magnetic memory devices and systems, optical memory devices and systems, fixed memory, and removable memory. The processor(s) 150 may be of any type suitable to the local technical environment, and may include one or more of general purpose computers, special purpose computers, microprocessors, digital signal processors (DSPs), and processors based on a multicore processor architecture, as non-limiting examples.

In this example, the computer 110 also comprises one or more network (N/W) interfaces (I/F(s)) 118, interface circuitry 178, and may include or be connected to interface elements 173. A server, depending on implementation, may only be accessed remotely (e.g., via a N/W IF 118), and as such would not use the interface elements 173, which could include a display, keyboard, mouse, and the like. It is also noted that a "computer system" as this term is used herein may include multiple processors and memories, e.g., in a cloud-based system.

The NW I/F(s) 118 may be wired and/or wireless and communicate over the Internet/other network(s) via any communication technique. In this example, the NW I/F(s) 118 comprise one or more transmitters 118-1, and one or more receivers 118-2. Such transmitters 118-1 and receivers 118-2 can be wireless radio frequency (RF) transmitters or receivers supporting, e.g., cellular or local or wide area network frequencies and protocols. The transmitters or receivers may also be wired and support wired protocols such as USB (universal serial bus), networks such as Ethernet, and the like. There may also be a combination of these protocols used.

Typically, issues caused by leaving an application in an incorrect state are handled by "transactions". Transactions must succeed completely or fail completely. Transactions provide Atomicity, Consistent state transitions, Isolation, and Durability (ACID) via two-phase commit, however this approach is considered to be unfeasible in a web-service environment. First, techniques such as distributed two-phase commit require long lock-times, which degrades performance since other clients can't access the web-service. Second, these techniques require the operation of a cooperating transaction coordinator on each of the participant web-services. This is typically unfeasible due to autonomy and related issues.

Another technique involves breaking up Long Lived Transactions (LLTs) into 'sagas'. LLTs hold on to database resources for relatively long periods of time, significantly delaying the termination of shorter and more common transactions. Typically, an LLT is considered a saga if it can be written as a sequence of transactions that can be interleaved with other transactions. A database management system guarantees that either all the transactions in a saga are successfully completed or compensating transactions are run to amend a partial execution. A compensating transaction is used to undo the work performed by the LLT.

Figure 2:
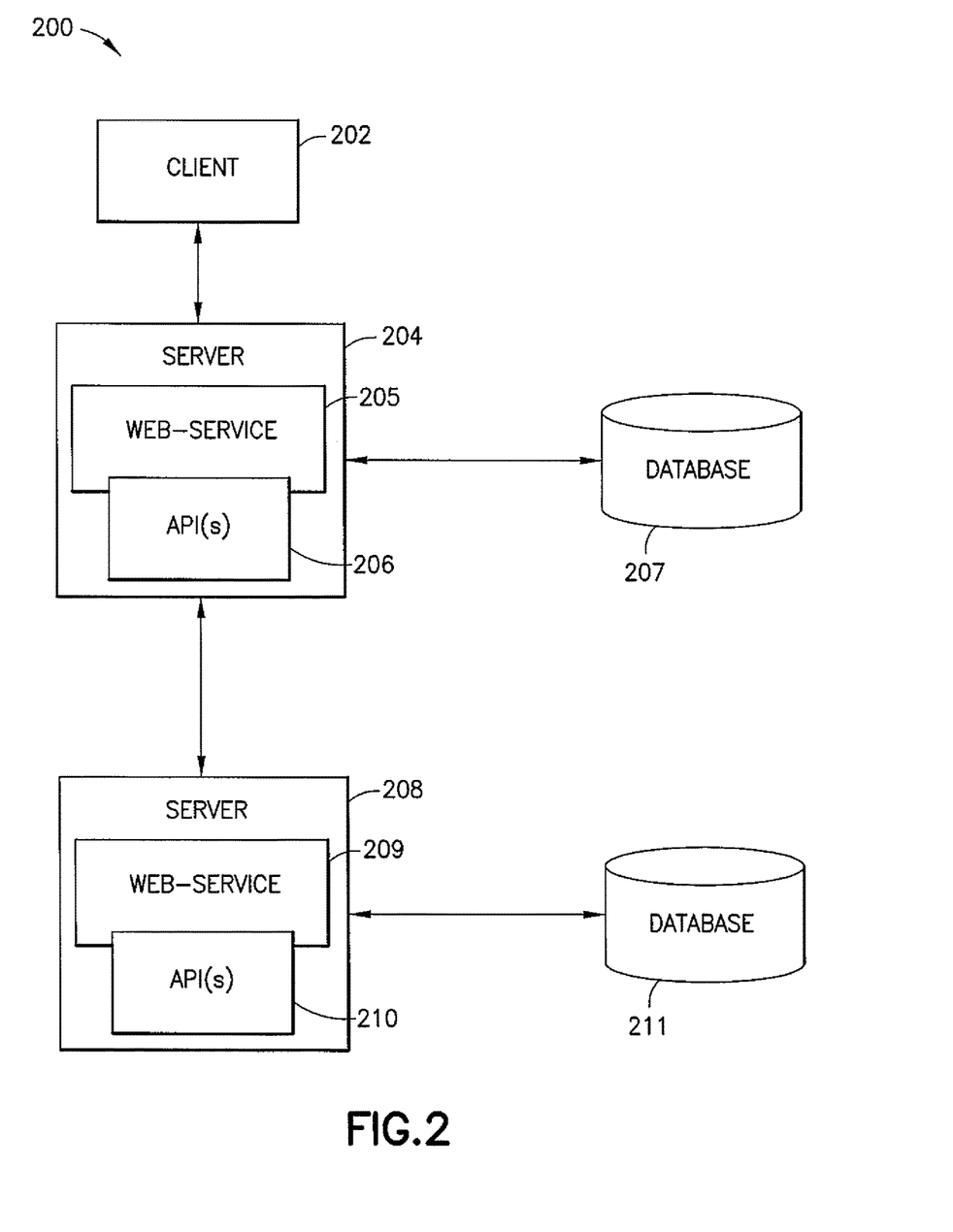
FIG. 2 is a simplified block diagram of an exemplary web-service environment in accordance with exemplary embodiments.

Referring now to FIG. 2, this figure illustrates an exemplary web-service environment 200 according to an exemplary embodiment. FIG. 2 illustrates one possible example and there are many others, such as systems with webservers, application servers, and cloud applications and servers. It should also be understood that the exemplary web-service environment 200 could also have more or less clients, databases, and servers for example. In the example shown in FIG. 2, the web-service environment 200 includes a client 202, servers 204, 208, and databases 207, 211. The client, servers, and databases may communicate over one or more networks. For instance, the network could be or include a local area network (LAN), a wide area network (WAN), the Internet, or the "cloud", e.g., and one or more of the servers 204, 208 could be a webserver or a cloud-based server. Although the databases 207, 211 are shown separate from the servers 204, 208, it should be understood that one or more of the databases could be a 'local' database of the server.

In the example shown in FIG. 2, each of the servers 204, 208 include a web-service 205 and web-service 209. Each of the web-services may also be associated with one or more API(s) 206, 210. As can be seen from the example in FIG. 2, in modern web-services, a single function point can may involve multiple web services APIs (this is especially the case in micro-service architectures). For example, web-service (WS) 205 may provide a create purchase-order API as one of the API(s) 206, which creates a purchase-order for a user u. WS 205 must retrieve information about user u from WS 209 through a retrieve API provided as one of the API(s) 210. For example, the retrieve API could access the information on database 211. If WS 205 succeeds in creating the purchase-order, it must then invoke an update API provided as one of the API(s) 206 to update the information in WS 209, e.g., to update a balance of a department reflecting the purchase.

For the implementation of the create-order API, WS 205 has to deal with the possibility that, although it has created the purchase-order in its system, the invocation of update API fails. The failure itself can manifest as an HTTP 500 or as a network failure that results in a timeout. In typical transactional systems, the update API would be implemented as a transaction with ACID properties that guarantee that either all states are updated or none are updated. This allows the update API to be re-invoked safely when a failure occurs in the middle of processing. However, because of performance and autonomy considerations, such classical transactions are not feasible in a modern web-eco system.

Embodiments herein relate to techniques for Web Service Orchestration (WSO) that provide a unified approach for solving tasks that must be addressed when implementing a web-service, including: encapsulating multiple web-service calls; timer tasks; and client-server operational-log replay. Solving these tasks robustly requires enabling stateful processes to persist state in a common resilient source; an API for developers to decompose a task into a series of sub-tasks; and the capability to execute a sequence of sub-tasks in a developer-specified way. These techniques must function properly despite intermittent environment-induced errors such as: process errors, network errors, and web-service API errors.

The techniques described herein provide a less rigorous (pseudo)-transactional approach in which programmers can specify a web-service invocation that serves as a compensation transaction to undo the effects of an API call if some failure occurs. For example, a server that is implementing a "macro" transaction (e.g. saga) may decompose the multiple web-service invocations into micro-transactions. When one or more of these micro-transactions fail, the work performed by the micro-transactions that have been partially done can be undone, for example, by using compensating web-transactions. According to exemplary embodiments, intent-logging is performed using a service that is external to the executing server that is used for recovery when one of the micro-transactions call times out, or when the executing server fails during execution of the macro-transaction. In addition, techniques described herein provide programmers the ability to specify a web-service invocation that serves as a probe transaction to determine whether a timeout in the invocation of web service API needs to be undone or whether the web service API in fact succeeded. These probe transactions are used to resolve the inherent ambiguity introduced by micro-transactions that time out.

Embodiments described herein are implemented using a web services orchestration (WSO) library which provides: (1) workflow orchestration of web-service API invocations allowing programmers to specify pre-conditions for each web-service invocation, and invocations for transaction success and failure; and (2) transaction coordination of web-service API invocations for specifying how to compensate for a failed web-service call and how to determine if the web-service failed or simply timed-out. The WSO library may be implemented in various ways, such as an application program interface (API) for JAVASCRIPT for example.

It should be understood that the formats and names used to describe the various parameters and functions herein are merely examples and other formats or names may also be used without departing from the embodiments described herein.

Micro-Transactions

Micro-transactions refer to the smallest granularity unit-of-work (uow) that WSO guarantees will be invoked with the WSO pseudo-transactional behavior despite service failure. This guarantee may be made because:

- WSO stores the state needed to invoke the micro-transaction persistently;
- WSO stores the result of the micro-transaction's persistently; and
- WSO may ensure that a given micro-transaction instance will be executed exactly once.

The function that is executed by a micro-transaction, namely the work that actually "gets done", is a special resilient function. Its resiliency stems from the fact that WSO can provide the function with pseudo-(compensational)-transaction semantics. For instance, assume fn is a JavaScript function (e.g. a web-service invocation that can fail or timeout). A probe function is associated with fn that is invoked by WSO whenever fn times out. The role of a probe function is to clear up the confusion in the outcome of fn execution, in particular whether fn succeeded or not. If the probe itself times out, WSO repeats the probe invocation (e.g. predetermined or infinite number of times.)

A compensation function may also be associated with fn that is invoked by WSO whenever the failure of some other micro-transaction implies that WSO must undo all work performed in a given macro-transaction. WSO compensates for all work performed in a failed macro-transaction by invoking the compensation function of every fn that did succeed. The signature of the compensation function may be (fn return value, fn arg 1, fn arg 2, . . . ).

A resilient function is a function triple consisting of: {fn, compensation, probe} functions. Each of these functions returns a promise. A promise is an object that represents the return value or the thrown exception that the function may eventually provide. This allows the WSO to eventually determine whether an invocation (e.g. asynchronous invocation) succeeded or failed, the result of the operation, or whether the invocation timed out.

WSO clients invoke the register_fn( ) API to create an association between the name used to refer to the resilient function and the function triple that WSO uses to provide resiliency. Thus, the register_fn API may be denoted as follows:

register_fn: function (fn_name, fn, comp_fn, probe_fn)

For instance, the function triple above may also be referred to as DO, UNDO, and PROBE functions, respectively. Accordingly, when the DO function is called, the micro-transaction is executed; when the UNDO function is called, it compensates for an execution of the micro-transaction; and when the PROBE function is called it tests whether the micro-transaction was successfully executed after a timeout. The DO/UNDO/PROBE functions may be asynchronous as they each return a promise.

Another attribute of micro-transactions, is that they can express a dependency on one or more other micro-transactions. In other words, each micro-transaction may have a set of prerequisites, which may be implemented as an array of Boolean-valued functions whose results must all evaluate to true in order for WSO to invoke the micro-transaction. If the array is empty, WSO will immediately invoke the micro-transaction. Otherwise, the array elements may be a hash with, for example, the following three properties:

- utxn_id: names another micro-transaction.
- args: arbitrary static JSON data.
- fn_name: names a test function with a signature of (result, args)→Boolean. The result parameter represents the result of executing the utxn_id micro-transaction. The args parameter corresponds to the args property in the prerequisite hash. WSO will invoke fn_name with these parameters and invoke the micro-transaction when all of its pre-requisites evaluate to true.

The following three special test functions are supplied by the WSO API and are used for testing whether the dependencies (or prerequisites) of other micro-transactions have been satisfied:

1. $testForSuccess—tests for micro-transaction completing successful;
2. $testForFailure—tests for micro-transaction failing; and 3. $testForCompletion—tests for micro-transaction completion (either success or failure).

WSO client invokes register_test_fn( ) to create the association between the test function's name and implementation, which may be denoted as register_test_fn (fn_name, fn).

The actual micro-transaction invocation is specified with a function name and the function arguments specified in a hash. The function name must correspond to a resilient function that was previously registered using the register_fn( ) API described above.

Examples of micro-transaction functions are, for example, web-service (e.g., HTTP, REST, SOA) calls or local calls.

Macro-Transactions

A macro-transaction refers to a set of micro-transactions, where the set defines a larger-scope uow, for example, in the same way that a function implementation can invoke multiple other functions. At runtime, the notion of a macro-transaction allows an efficient WSO implementation since a less persistent state needs to be accessed to move the macro-transaction from one state to another. A micro-transaction is not a defined sequential step of a macro-transaction because that model would not allow proper handling of branching logic and exceptions. Instead, a micro-transaction is a uow with a specified set of pre-requisites that, when satisfied, trigger execution of that micro-transaction. On a per-macro-transaction basis, WSO tracks the state of its micro-transactions. For example, the WSO may cause the states of the micro-transactions to be logged in an external database such as a REDIS or CLOUDANT database. An external database is a database that is managed by a server process that is separate from any WSO process. REDIS is a data structure server that is open-source, networked, in-memory, and stores keys with optional durability. CLOUDANT is an open source non-relational, distributed database service of the same name that requires zero-configuration. Logging the states in a REDIS database allows for the logged transactions states to survive server crashes, such as Nodejs server crashes. Alternatively, in some embodiments, the logged states of the micro-transactions may be logged in an internal database. The logged states may indicate whether a given micro-transaction failed, succeeded, or timed out. Whenever a micro-transaction invocation completes, WSO examines the result of the micro-transaction; evaluates the pre-requisites of the other micro-transactions in the set; and invokes the set of micro-transactions whose pre-requisites have been met. Accordingly, a macro-transaction may correspond to a directed acyclic graph whose edges represent micro-transaction uows.

At runtime, WSO may execute the larger uow represented by the macro-transaction by a "parallel navigation" of the graph based on, for example, the following rules:
1. Navigate to every micro-transaction whose prerequisite set is satisfied. In the 0th step of the navigation, this will be the set of micro-transactions with no prerequisite;
2. Execute all micro-transactions that were reached in the previous step;
3. Re-evaluate the prerequisites of all micro-transactions whenever a micro-transaction completes; and
4. Return to step 1 unless WSO has navigated to a designated success or failure node.

Accordingly, a micro-transaction may be identified by (1) a label that specifies the macro-transaction that it belongs to, and (2) a label that distinguishes the micro-transaction from the other micro-transaction of that macro-transaction. The former may be referred to as macro-txn id, and the latter a micro-txn id.

Creating micro-transactions may be accomplished through the following API call: wso.micro_txn( ), which may be defined as follows:
function (template_id, utxn_id, prerequisites, fn_name, args),
where template_id names the macro-transaction; utxn_id is used to construct a micro-transaction id; prerequisites are the micro-transaction prerequisites as described above; fn_name names the function that will be invoked when the micro-transaction is invoked; args are the parameter values that will be passed to fn_name.

A macro-transaction is constructed (or 'templated') through a sequence of micro-txn( ), register_fn( ) and register_test_fn( ) invocations. Clients initiate execution of a macro-transaction through the WSO exec_macro( ) function, which is defined as follows:
exec_macro(template_id, txn_id, input, async),
where: template_id names the macro-transaction; txn_id specifies the instantiated name of the macro-transaction input is a hash whose properties are the parameters to the function; async when false specifies that the client will synchronously wait for the macro-transaction to return a value before proceeding (e.g., via promise resolution/rejection); otherwise, continues processing immediately after invoking exec_macro( ).

Macro-transactions typically signal success or failure to their invoker by returning, e.g., a promise. Two special DO functions may be used to finalize the macro-transaction state and return a value. In particular, $success sets the macro-transaction state to 'done' and returns a value; and $fail sets the macro-transaction state to 'failed' and runs compensation. For the $fail function, the state of the macro-transaction is updated to 'compensating'. The UNDO function is run for all successful micro-transactions in reverse order. Then, the macro-transaction state is updated to 'failed'.

Although both a micro-transaction and a macro-transaction represent a uow, only a micro-transaction actually can be directed to perform work via its function. A macro-transaction does not itself perform work; rather the work is performed to the extent that its micro-transactions perform work as permitted by satisfying their prerequisite set. For this reason, a macro-transaction cannot invoke another macro-transaction. In contrast, a micro-transaction may invoke a macro-transaction.

Execution of Macro-Transactions

According to example embodiments, a WSO runtime engine may persistently store macro-transactions and their corresponding micro-transactions in a datastore. These units-of-work are available to any server or process with access to the datastore. The WSO may work across multiple concurrent servers/workers. A server or process is able to pull off a unit-of-work from the datastore that has no unsatisfied dependency on another micro-transaction and executes it. When the micro-transaction is completed, it may then check if any dependencies have been satisfied on which other micro-transactions are waiting. The WSO may coordinate access to the shared datastore to ensure that a uow is executed exactly once. Techniques described herein exploit multicore, multi-process performance improvements safely. For example, some embodiments automatically update the micro-transaction status to "in progress". Concurrency control is provided by checking if micro-transaction status is set to "waiting" before updating the status. In this way, if two updates happen at about the same time, the second one will see that the status is incorrect, and that server will abort its attempt to execute the micro-transaction.

Figure 3:
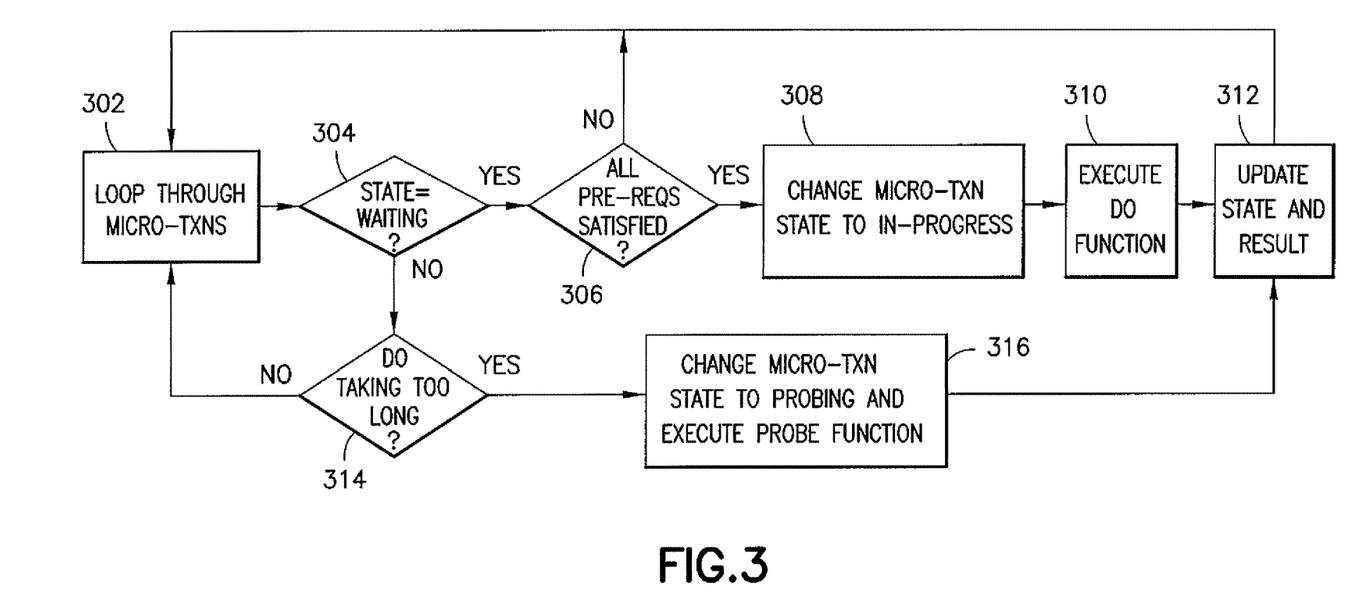
FIG. 3 is a flow chart showing the execution of a set of micro-transactions in accordance with exemplary embodiments.

Referring now to FIG. 3, this figure is a flow chart for the execution of a set of micro-transactions according to exemplary embodiments. Although not specifically shown, the process shown may be repeated for a set of macro-transaction, e.g., by looping through each macro-transaction in the set.

At 302 the set of macro-transaction are executed by looping through each of the micro-transaction as shown at 302. At 304, a given micro-transaction's state is checked to determine whether the state is set to 'waiting'. A 'waiting' state indicates that a micro-transaction has not yet started. If the state for the given micro-transaction is waiting, then at 306 it is determined whether all prerequisites of the given micro-transaction have been met. If all prerequisites have been satisfied, then the state of the given micro-transaction is changed to 'in-progress' at 308 which indicates that the micro-transaction is currently being executed. At 310, the DO function of the given micro-transaction is called, and at 312 the state of the micro-transaction may be updated depending on the result. For example, the state may be updated to 'done', 'failed', or the given micro-transaction may still be executing. The process continually loops back to 302 following 312 to check other micro-transactions. In some embodiments, the completion of a micro-transaction causes an additional check of all other micro-transactions and/or a check is performed periodically to catch timed-out micro-transaction calls. If the state of a micro-transaction is not 'waiting' at 304, then at 314 it is determined whether the DO function of the micro-transaction is taking too long. For example, the timer may be set by the developer, a default timer may be set, or an HTTP call might return an error if the call times out. If it is determined that the DO function is not taking too long, then the process continues at 302. If it is determined that the DO function is taking too long (e.g. expiry of the timer), then at 316 the micro-transaction's state is set to 'probing' (indicating that the micro-transaction has timed out) and the PROBE function of the micro-transaction is called. As previously mentioned, the PROBE function determines whether the micro-transaction succeeded or failed and thus the state of the micro-transaction can be updated based on the result of the PROBE function at 312. The process continues until the macro-transaction succeeds or fails (e.g. until either $success or $fail is called).

The execution of one or more macro-transactions may also be represented by the following example pseudo-code:

```
1:  For all macro-transactions, do:
2:      Read macro-transaction record from database
3:      LOOP: For all micro-transactions, do
4:          If micro-transaction state = WAITING
5:              If all prerequisites satisfied, do
6:                  Update the macro-transaction record with
                    call_id = UUID
7:                  Execute the DO function
8:                  Update the macro-transaction record with the DO
                    function result
9:                  Goto LOOP
10:         Else if micro-transaction state = IN PROGRESS
            and elapsed time > timeout
11:             Update the macro-transaction record
with state = PROBING and call_id = UUID
12:             Execute PROBE function
13:             Update the macro-transaction record with the
                PROBE function result
14:             Goto LOOP
```

Handling Failures

According to embodiments herein, the WSO may be configured to handle failures of macro-transactions resulting from, e.g., failed micro-transactions. Macro-transactions may fail for different reasons, including: client errors (e.g. HTTP 400 error); server errors (e.g. HTTP 500 error); and entering an unknown state due to a timeout. Embodiments herein compensate for these type of failures at a micro-transaction granularity using the programmer specified compensating functions.

Figure 4:
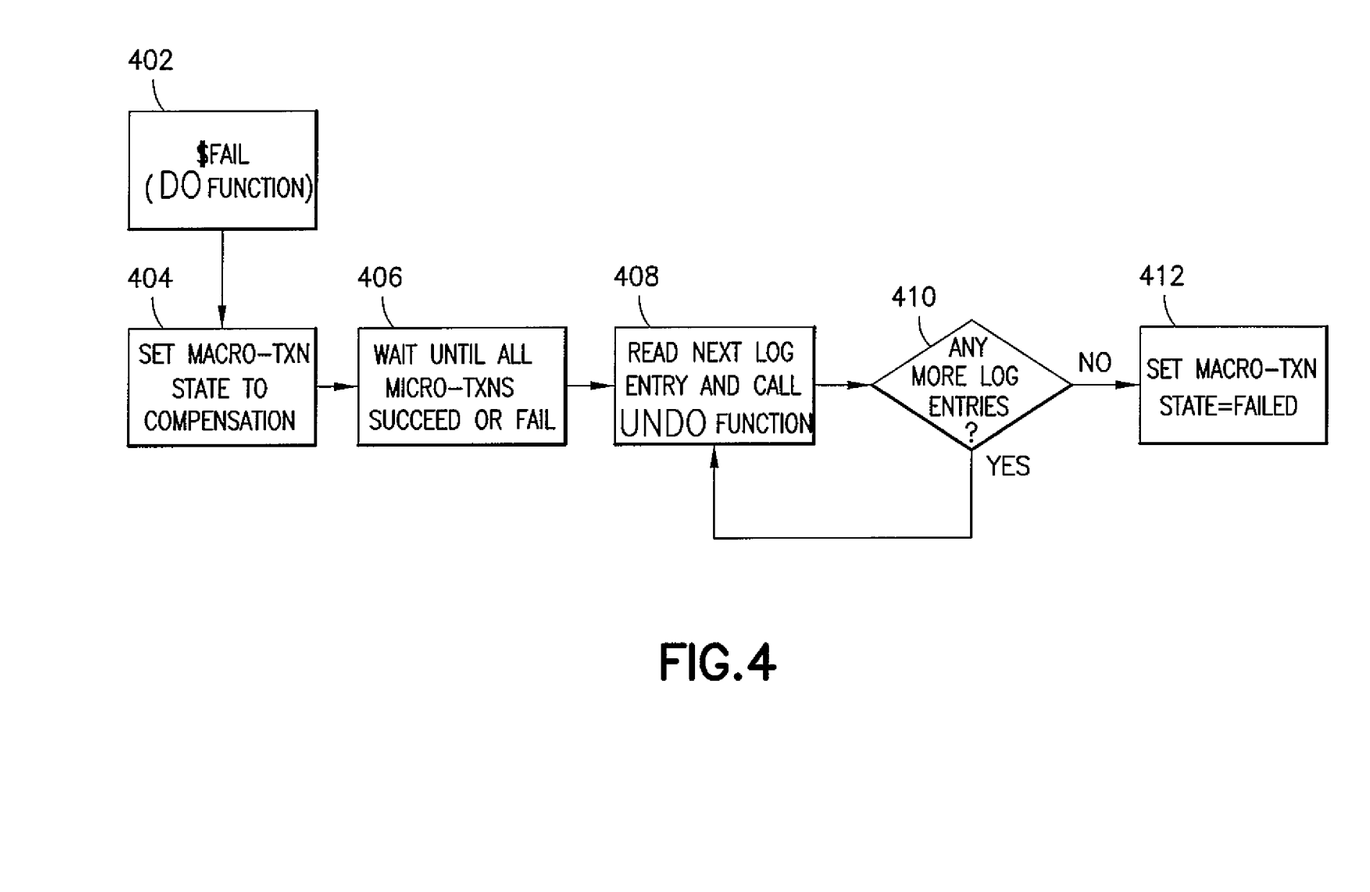
FIG. 4 is a process flow diagram for handling macro-transaction failures using compensating functions in accordance with exemplary embodiments.

Referring now to FIG. 4, this figure is an example process flow diagram for handling macro-transaction failures using compensating functions according to exemplary embodiments. At 402, the macro-transaction's special $fail function has been invoked, e.g., based on a determination that a DO function of a micro-transaction has failed. At 404, the macro-transaction's state is set to 'compensating'. At 406, the process waits until it is determined whether all of the micro-transactions associated with the macro-transaction have succeeded or failed. At 408 and 410, an UNDO function is called for each micro-transactions based on the log entries. At 412, the macro-transaction state is set to 'failed'.

The compensation techniques described herein are useful in, for example, situations as where a single function-point in a modern web-application encapsulates multiple web-service invocations invoked against multiple services. In these situations, typical two-phase commit protocols would require re-engineering the participating services, which are usually autonomous so that a cooperating transaction coordinator on each of the participant web-services may be unfeasible. Further, these conventional techniques require holding locks for extended periods of time which degrades performance since other clients are unable to access the web-service. Using the compensation techniques described herein allow compensation to be handled with micro-transaction granularity, based on programmer specified UNDO function to undo previous work when failure occurs.

Figure 5:
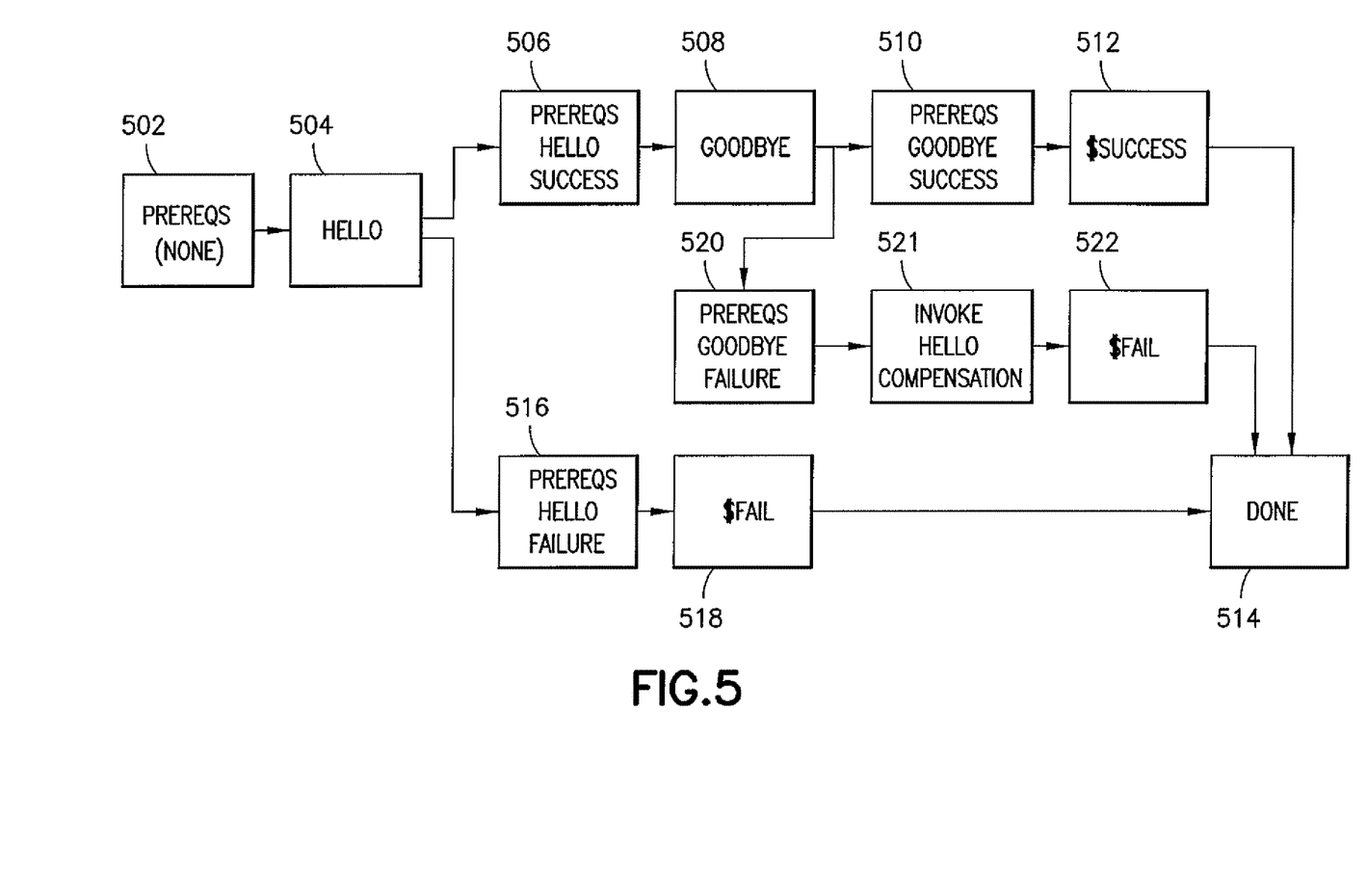
FIG. 5 an example flow chart showing the execution of a macro transaction having micro-transactions with dependencies according to exemplary embodiments in accordance with exemplary embodiments.

Referring now to FIG. 5, this figure provides an example flow chart showing the execution of a macro transaction having micro-transactions with dependencies according to exemplary embodiments. The macro-transaction in the example in FIG. 5 is named Hello Goodbye, and a programmer has defined micro-transactions Hello and Goodbye, each of which also have defined DO, UNDO, and PROBE functions. For example, the programmer may specify the following:

The Hello micro-transaction is defined as: wso.micro_txn ('HelloGoodbye', 'Hello', [ ], 'Hello', { });

The Goodbye micro-transaction (which is dependent on Hello being successful) is defined as: wso.micro_txn ('HelloGoodbye', 'Goodbye', [{utxn_id: 'Hello', fn_name: '$testForSuccess', args: { }], 'Goodbye', { });

The success micro-transaction (which is dependent on Goodbye being successful) is defined as: wso.micro_txn('HelloGoodbye', 'success', [{utxn_id: 'Goodbye', fn_name: '$testForSuccess', args: { }], '$success', { });

The fail1 micro-transaction (which is dependent on Hello failing) is defined as: wso.micro_txn('HelloGoodbye', 'fail1', [{utxn_id: 'Hello', fn_name: '$testForFailure', args: { }], '$fail', { }); and The fail2 (which is dependent on Goodbye failing) is defined as: wso.micro_txn('HelloGoodbye', 'fail2', [{utxn_id: 'Goodbye', fn_name: 'RestForFailure', args: { }], '$fail', { }).

At 502 in FIG. 5, the prerequisites of the Hello micro-transaction are checked. In this case, the Hello micro-transaction has no prerequisites. The Hello function is invoked at 504. For the case the Hello function succeeds, then the prerequisites of the Goodbye micro-transaction have been fulfilled as shown at 506, and then the Goodbye function is called at 508. If the Goodbye function also succeeds (510) then the prerequisites for the macro-transaction's $success function have been met, and therefore $success is called at 512. In this case, execution of the HelloGoodbye macro-transaction is successfully completed at 514.

For the case that Hello micro-transaction fails at 504, then the prerequisites for the fail1 micro-transaction have been met at 516, and the macro-transaction's $fail function is called at 518. Note that in this case, the Goodbye micro-transaction is not called, and instead the process continues directly to 'done' at 514. It can also be seen from FIG. 5, that Hello may succeed at 504 but Goodbye may fail at 508, which causes the prerequisites for fail2 to be fulfilled at 520, the Hello compensation function to be called at 521, the macro-transaction's $fail function to be called at 522 and the process continues to 'done' at 514.

Figures 6, 6B:
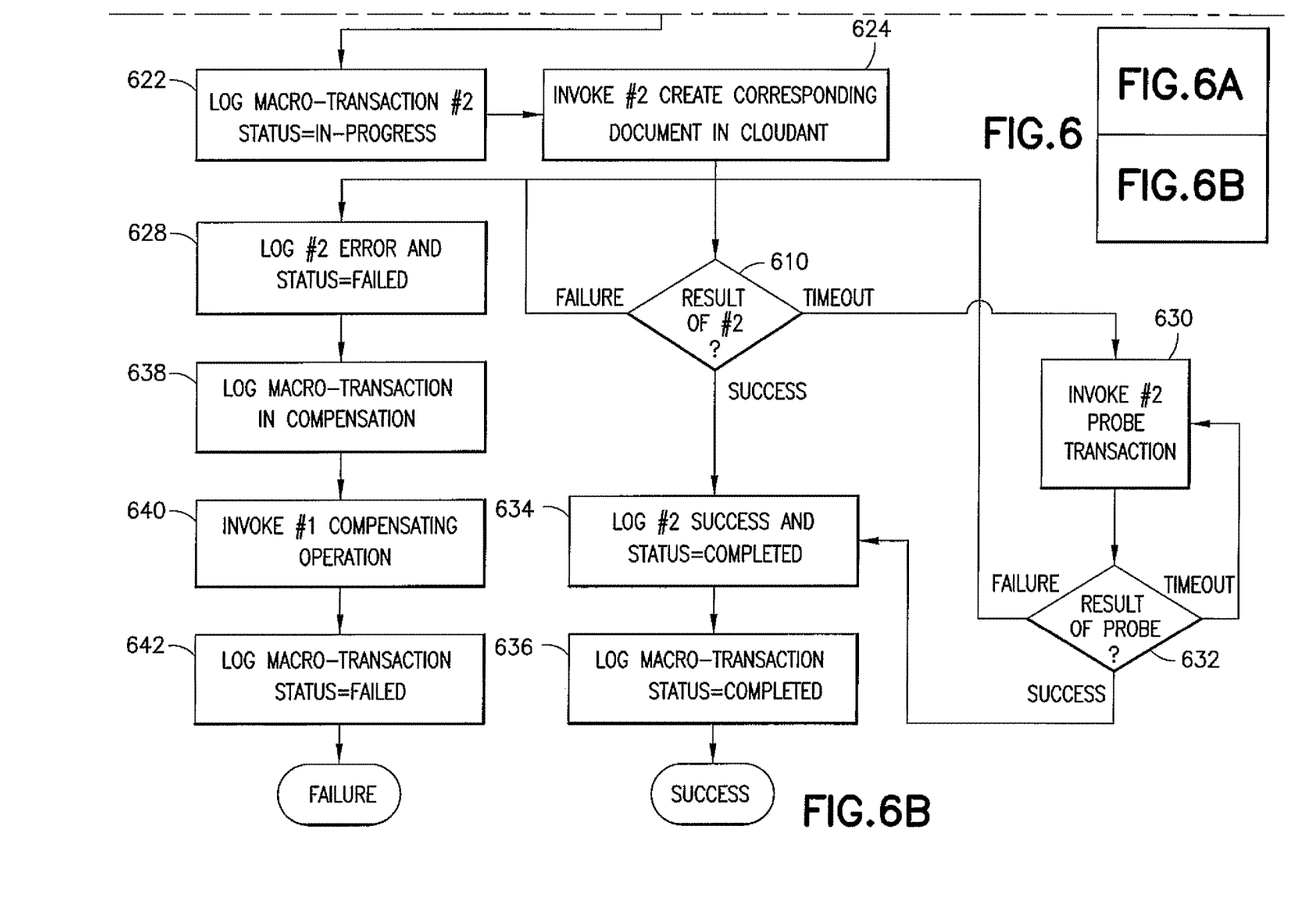
FIGS. 6A and 6B provide a process flow diagram for an example macro-transaction in accordance with exemplary embodiments.
Figure 6A:
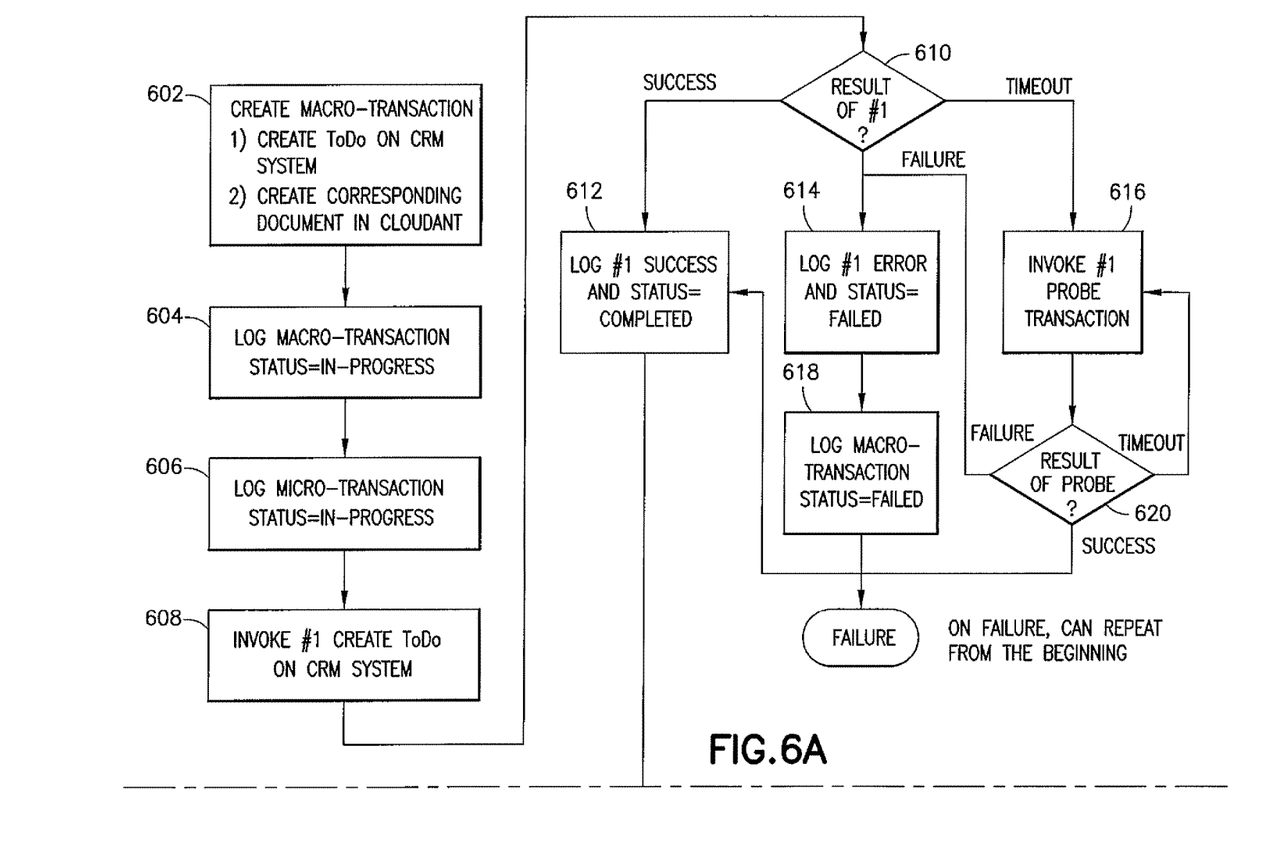

FIGS. 6A and 6B provide a detailed process flow diagram according to exemplary embodiments for an example macro-transaction. At block 602 of FIG. 6A, a macro-transaction is created which includes two micro-transactions, namely, (1) create a ToDo on a customer relationship management (CRM) system, and (2) create a corresponding document in a database (for this example CLOUDANT is used). At 604, the WSO system logs the macro-transaction state as 'in progress' and, at 606, logs the micro-transaction state 1 as 'in-progress'. At 608, the system invokes micro-transaction #1 to create the ToDo on the CRM system. The result of micro-transaction #1 may be one of: success, failure, or timeout as shown at 610. For the case the result is 'failure', the state of micro-transaction #1 is updated to 'failed' as shown in 614, and the state of the macro-transaction is also updated to failed as shown in 618. For this case, since the macro-transaction has failed, the macro-transaction can optionally be re-run starting at 602.

For the case the result from 610 is 'timeout', then the probe transaction corresponding to micro-transaction #1 is invoked, as shown in 616, to determine whether micro-transaction #1 failed or succeeded as shown at 620. In case the micro transaction 1 failed, flow continues to 614 as noted above. If the probe transaction times out at 620, the probe function may be continuously repeated until a result of 'failed' or 'succeeded' is obtained. If either the result of micro-transaction #1 at 610 is 'success' or the result of the probe transaction at 620 is 'success', then flow continues to 612. At 612, the state of micro-transaction #1 is logged as 'complete'. Then, at 622, the state of micro-transaction #2 is logged as 'in-progress' and micro-transaction #2 is invoked at 624 to create the corresponding document in CLOUDANT. The result of micro-transaction #2 may also indicate 'failure', 'success', or 'timeout' as shown at 626. For the case failure is indicated, the state of micro-transaction #2 is updated to 'failed' at 628; and the state of the macro-transaction is updated to 'compensating' at 638. At 640, the compensating operation corresponding to micro-transaction #1 is invoked to 'undo' the changes made by micro-transaction #1. In this case the compensation operation deletes the ToDo from the CRM system. At 642, the state of the macro-transaction is updated to 'failed' in which case the macro-transaction has unsuccessfully completed.

For the case the result of 626 is success, then the states of micro-transaction #2 and the macro-transaction are updated to 'completed' as shown by 634 and 636, and the macro-transaction is successfully completed. For the case the result in 626 indicates timeout then the probe transaction corresponding to micro-transaction #2 is invoked at 630. The probe transaction may be repeated if the result indicates 'timeout'. If the result of the probe transaction from 632 indicates failure, then flow proceeds as described above from 628. If the result of the probe transaction from 632 indicates 'success', then flow proceeds as described above from 634. If the result of 632 is 'timeout', the probe operation repeats at 630.

Figure 7:
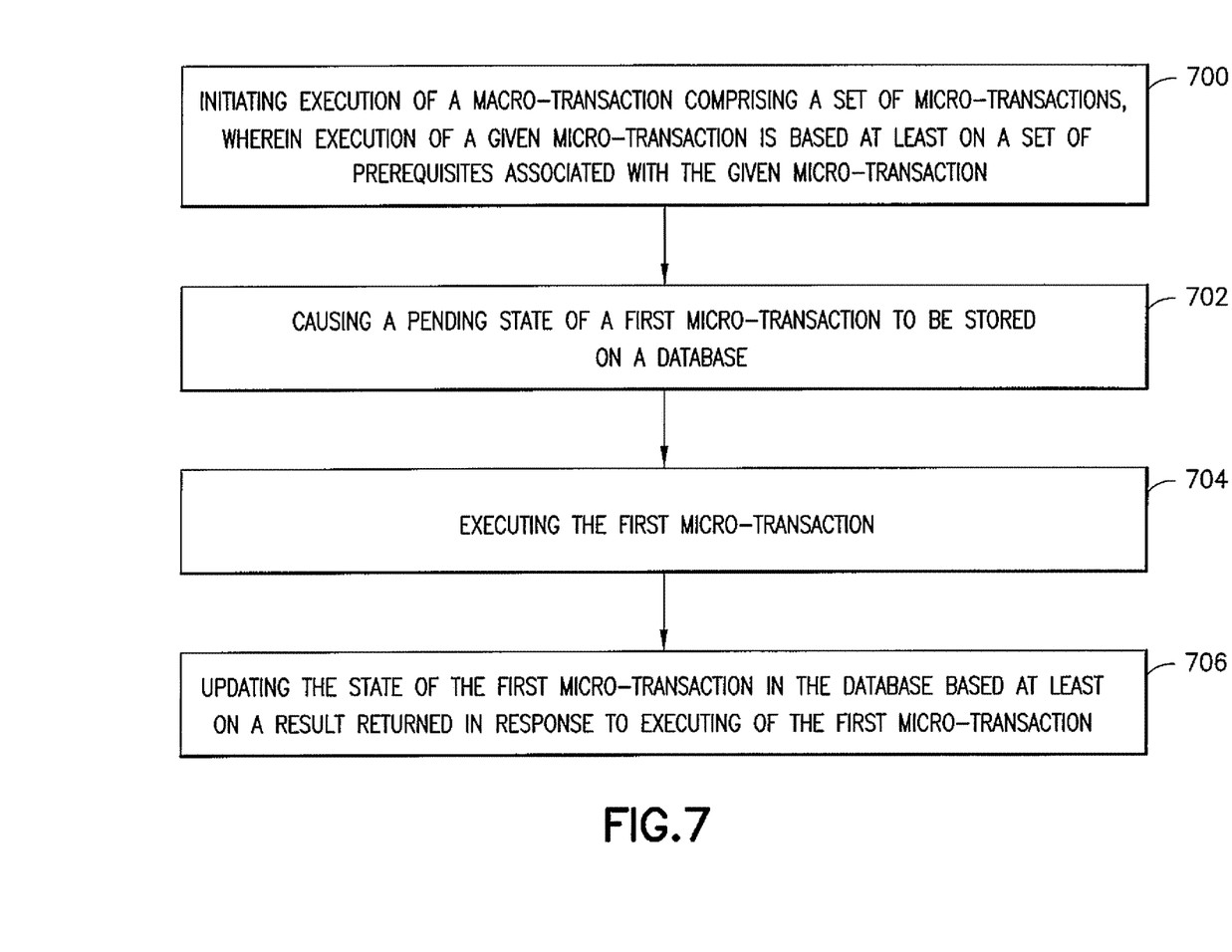
FIG. 7 is a logic flow diagram for management and recovery of multi-service web transactions, and illustrates the operation of an exemplary method, a result of execution of computer program instructions embodied on a computer readable memory, functions performed by logic implemented in hardware, and/or interconnected means for performing functions in accordance with exemplary embodiments.

FIG. 7 is a logic flow diagram for learned user interface interactivity tolerance based on information complexity, FIG. 7 illustrates the operation of an exemplary method, a result of execution of computer program instructions embodied on a computer readable memory, functions performed by logic implemented in hardware, and/or interconnected means for performing functions in accordance with exemplary embodiments. It is assumed one or more computer system, such as the computer system 100 of FIG. 1, performs the blocks in FIG. 7.

Referring to FIG. 7, an example method may comprise initiating execution of a macro-transaction comprising a set of micro-transactions, wherein execution of a given micro-transaction is based at least on a set of prerequisites associated with the given micro-transaction as indicated by block 700; causing a pending state of a first micro-transaction to be stored on a database; as indicated by block 702; executing the first micro-transaction as indicated by block 704; and updating the state of the first micro-transaction in the database based at least on a result returned in response to executing of the first micro-transaction as indicated by block 706.

The set of prerequisites may be at least one of: an empty set; and at least one prerequisite comprising a test corresponding to a state of at least one other micro-transaction in the set of micro-transactions such that execution of the given micro-transaction may be executed in response to fulfillment of the test. The result returned from executing the first micro-transaction comprises a promise indicating success, failure, or timeout. Updating the state of the first micro transaction may include: in response to the returned result indicating success, causing the stored state of the first micro-transaction to be updated to indicate that the first micro-transaction was successfully executed. The method may further include: in response to the returned result indicating failure: causing the stored state of the first micro-transaction to be updated to indicate that execution of the first micro-transaction failed; and executing a respective compensating function for each micro-transaction in the set that has a previously stored a success state in the database. The method may further include in response to the returned result indicating timeout: executing a probe function associated with the first micro-transaction to determine if the execution of the first micro-transaction failed or succeeded, and wherein the updating the state of the first micro-transaction may include updating the state based on the result of the probe function. Each micro-transaction corresponds to at least one of a web-service call or a local call. A micro-transaction may invoke another macro-transaction. Each micro transaction may be a triple comprising: a do function for executing the micro-transaction; an undo function for compensating for execution of the micro-transaction; and a probe function for testing whether the micro-transaction was successfully executed after a timeout.

An example embodiment may be provided in an apparatus, such as an apparatus according to FIG. 1 for example. The apparatus may include at least one processor; and at least one non-transitory memory including computer program code, the at least one memory and the computer program code configured to, with the at least one processor, cause the apparatus at least to: initiate execution of a macro-transaction comprising a set of micro-transactions, wherein execution of a given micro-transaction is based at least on a set of prerequisites associated with the given micro-transaction; cause a pending state of a first micro-transaction to be stored on a database; execute the first micro-transaction; and cause the state of the first micro-transaction to be updated in the database based at least on a result returned in response to execution of the first micro-transaction. The set of prerequisites may include at least one of: an empty set; and at least one prerequisite comprising a test corresponding to a state of at least one other micro-transaction in the set of micro-transactions such that execution of the given micro-transaction may be executed in response to fulfillment of the test. The result returned from execution of the first micro-transaction comprises a promise indicating success, failure, or timeout. The at least one memory and the computer program code may be configured to, with the at least one processor, to cause the apparatus at least to: cause the stored state of the first micro-transaction to be updated to indicate that the first micro-transaction was successfully executed in response to the returned result indicating success. The at least one memory and the computer program code may be further configured to, with the at least one processor, cause the apparatus at least to: in response to the returned result indicating failure: cause the stored state of the first micro-transaction to be updated to indicate that execution of the first micro-transaction failed; and execute a respective compensating function for each micro-transaction in the set that has a previously stored a success state in the database. The at least one memory and the computer program code may be further configured to, with the at least one processor, cause the apparatus at least to: in response to the returned result indicating timeout: execute a probe function associated with the first micro-transaction to determine if the execution of the first micro-transaction failed or succeeded, and cause the state of the first micro-transaction to be updated based on the result of the probe function. Each micro-transaction corresponds to at least one of: a web-service call or a local call. A micro-transaction may invoke another macro-transaction. Each micro transaction may be a triple comprising: a do function for executing the micro-transaction; an undo function for compensating for execution of the micro-transaction; and a probe function for testing whether the micro-transaction was successfully executed after a timeout. The execution of the micro-transactions may be performed according to a directed acyclic graph that is formed based on the set of prerequisites associated with each of the micro-transactions.

In an example embodiment, a computer program product for managing a macro-transaction may be provided. The computer program product may include a non-transitory computer readable storage medium having program instructions embodied therewith, the program instructions executable by a device to cause the device to: initiate execution of the macro-transaction having a set of micro-transactions, wherein execution of a given micro-transaction is based at least on a set of prerequisites associated with the given micro-transaction; cause a pending state of a first micro-transaction to be stored on a database; execute the first micro-transaction; and update the state of the first micro-transaction in the database based at least on a result returned in response to executing of the first micro-transaction.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   initiating execution of a macro-transaction comprising a set of micro-transactions, wherein each micro-transaction comprises a set of prerequisites, and wherein execution of a given micro-transaction is based at least on each prerequisite in the set of prerequisites associated with the given micro-transaction being satisfied;
   causing a state of a first micro-transaction of the set of micro-transaction to be stored on a database to indicate that the first micro-transaction is waiting to be executed in response to at least one prerequisite in the set of prerequisites associated with the first micro-transaction not being satisfied;
   causing a state of a second micro-transaction to be stored on the database to indicate the second micro-transaction is executing in response to determining that each prerequisite in the set of prerequisites associated with the second micro-transaction is satisfied;
   updating the state of the second micro-transaction in the database based at least on a result returned in response to executing the second micro-transaction; and
   determining whether the at least one prerequisite in the set of prerequisites associated with the first micro-transaction is satisfied based on the updated state of the second micro-transaction.

2. The method of claim 1, wherein the set of prerequisites comprises at least one of:
   an empty set; and
   at least one prerequisite comprising a test corresponding to a state of at least one other micro-transaction in the set of micro-transactions such that execution of the given micro-transaction is executed in response to fulfillment of the test.

3. The method of claim 1, wherein the result returned from executing the second micro-transaction comprises a promise indicating success, failure, or timeout.

4. The method of claim 3, wherein updating the state of the second micro-transaction comprises:
   in response to the returned result indicating success, causing the stored state of the second micro-transaction to be updated to indicate that the second micro-transaction was successfully executed.

5. The method of claim 3, further comprising:
   in response to the returned result indicating failure:
      causing the stored state of the second micro-transaction to be updated to indicate that execution of the second micro-transaction failed; and
      executing a respective compensating function for each micro-transaction in the set that has previously stored a success state in the database.

6. The method of claim 3, further comprising:
   in response to the returned result indicating timeout:
      executing a probe function associated with the second micro-transaction to determine if the execution of the second micro-transaction either failed or succeeded, and wherein the updating the state of the second micro-transaction comprises updating the state based on the result of the probe function.

7. The method of claim 1, wherein each micro-transaction corresponds to at least one of: a web-service call and a local call.

8. The method of claim 7, wherein execution of at least one of the micro-transactions in the set invokes another macro-transaction.

9. The method of claim 1, wherein each micro-transaction is a triple comprising: a do function for executing the micro-transaction; an undo function for compensating for execution of the micro-transaction; and a probe function for testing whether the micro-transaction was successfully executed after a timeout.

10. An apparatus comprising:
at least one processor; and
at least one non-transitory memory including computer program code, the at least one memory and the computer program code configured to, with the at least one processor, cause the apparatus at least to:
    initiate execution of a macro-transaction comprising a set of micro-transactions, wherein each micro-transaction comprises a set of prerequisites, and wherein execution of a given micro-transaction is based at least on each prerequisite in the set of prerequisites associated with the given micro-transaction being satisfied;
    cause a state of a first micro-transaction of the set of micro-transaction to be stored on a database to indicate that the first micro-transaction is waiting to be executed in response to at least one prerequisite in the set of prerequisites associated with the first micro-transaction not being satisfied;
    cause a state of a second micro-transaction to be stored the database to indicate the second micro-transaction is executing in response to determining that each prerequisite in the set of prerequisites associated with the second micro-transaction is satisfied;
    cause the state of the second micro-transaction to be updated in the database based at least on a result returned in response to execution of the second micro-transaction; and
    determine whether the at least one prerequisite in the set of prerequisites associated with the first micro-transaction is satisfied based on the updated state of the second micro-transaction.

11. The apparatus of claim 10, wherein the set of prerequisites comprises at least one of:
an empty set; and
at least one prerequisite comprising a test corresponding to a state of at least one other micro-transaction in the set of micro-transactions such that execution of the given micro-transaction is executed in response to fulfillment of the test.

12. The apparatus of claim 10, wherein the result returned from execution of the second micro-transaction comprises a promise indicating success, failure, or timeout.

13. The apparatus of claim 12, wherein the at least one memory and the computer program code are configured to, with the at least one processor, cause the apparatus at least to:
    cause the stored state of the second micro-transaction to be updated to indicate that the second micro-transaction was successfully executed in response to the returned result indicating success.

14. The apparatus of claim 12, wherein the at least one memory and the computer program code are further configured to, with the at least one processor, cause the apparatus at least to:
    in response to the returned result indicating failure:
        cause the stored state of the second micro-transaction to be updated to indicate that execution of the second micro-transaction failed; and
        execute a respective compensating function for each micro-transaction in the set that has a state previously stored in the database indicating successful execution of the micro-transaction.

15. The apparatus of claim 12, wherein the at least one memory and the computer program code are further configured to, with the at least one processor, cause the apparatus at least to:
    in response to the returned result indicating timeout:
        execute a probe function associated with the second micro-transaction to determine if the execution of the second micro-transaction failed or succeeded, and
        cause the state of the second micro-transaction to be updated based on the result of the probe function.

16. The apparatus of claim 10, wherein each micro-transaction corresponds to at least one of: a web-service call and a local call.

17. The apparatus of claim 16, wherein execution of at least one of the micro-transactions in the set invokes another macro-transaction.

18. The apparatus of claim 16, wherein each micro-transaction is a triple comprising: a do function for executing the micro-transaction; an undo function for compensating for execution of the micro-transaction; and a probe function for testing whether the micro-transaction was successfully executed after a timeout.

19. The apparatus of claim 16, wherein the execution of the micro-transactions is performed according to a directed acyclic graph that is formed based on the set of prerequisites associated with each of the micro-transactions.

20. A computer program product for managing a macro-transaction, the computer program product comprising a non-transitory computer readable storage medium having program instructions embodied therewith, the program instructions executable by a device to cause the device to:
    initiate execution of the macro-transaction having a set of micro-transactions, wherein execution of a given micro-transaction is based at least on a set of prerequisites associated with the given micro-transaction;
    cause a pending state of a second micro-transaction to be stored on a database;
    execute the second micro-transaction; and
    update the state of the second micro-transaction in the database based at least on a result returned in response to executing of the second micro-transaction.

* * * * *